J. W. Wilcox,
Horse Power.
No. 110,320. Patented Dec. 20. 1870.

Witnesses,
Charles M. Young
H. A. Daniels

J. W. Wilcox Inventor, by
C. S. Whitman, Attorney,

United States Patent Office.

JOHN W. WILCOX, OF MACON, GEORGIA, ASSIGNOR TO HIMSELF AND JOHN S. SCHOFIELD, OF SAME PLACE.

Letters Patent No. 110,320, dated December 20, 1870.

IMPROVEMENT IN HORSE-POWERS.

The Schedule referred to in these Letters Patent and making part of the same.

*To all whom it may concern:*

Be it known that I, JOHN W. WILCOX, of Macon, in the county of Bibb and in the State of Georgia, have invented a new and useful Improvement in Horse-Power; and do hereby declare that the following description, taken in connection with the accompanying drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of horse-powers which is used more especially for the purpose of operating cotton-gins, and the nature thereof consists in certain improvements in the details of the construction of the same, by means of which the serious consequences resulting from the sinking of the gin-house floor, upon which part of the machinery rests, is entirely obviated, the mechanism rendered self-adjustable, and the parts composing the machine so arranged and combined as to facilitate convenience of operation.

In the accompanying drawing, which illustrates my invention and forms a part of the specification thereof—

Figure 1:
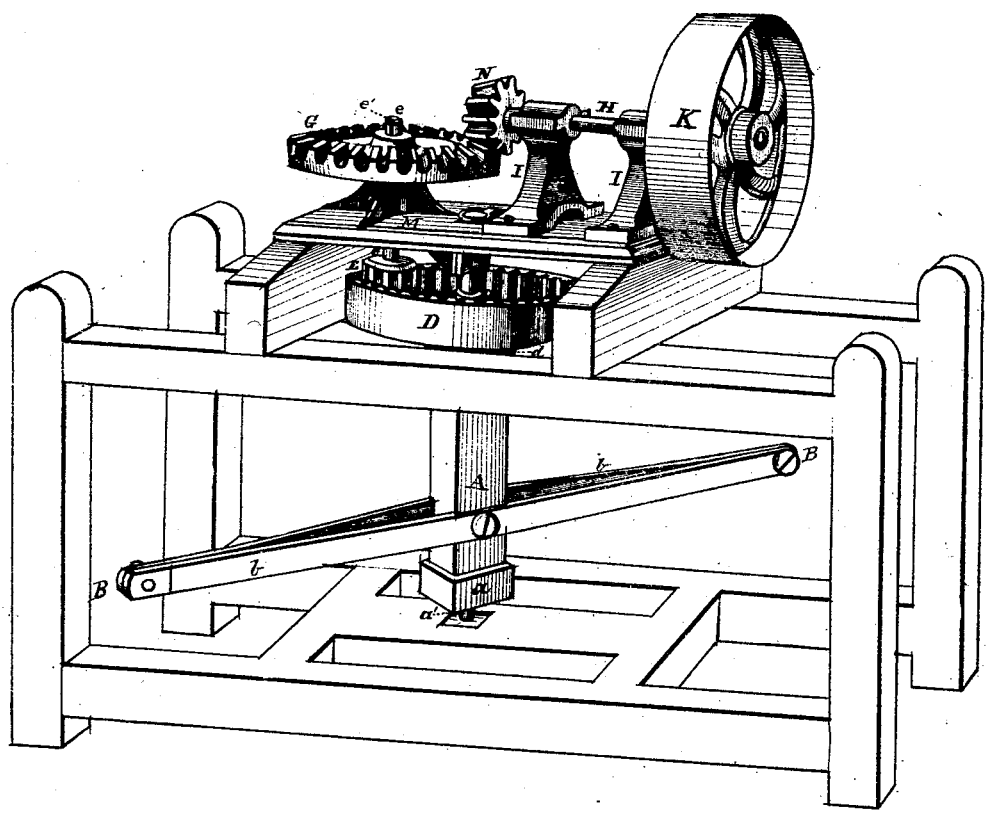
Figure 1 is a perspective view of my invention, illustrating the relative position of the various parts thereof.
Figure 2:
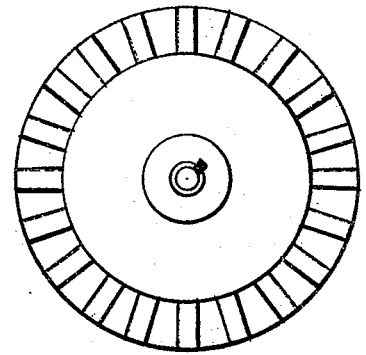
Figure 2 is a plan view.
Figure 3:
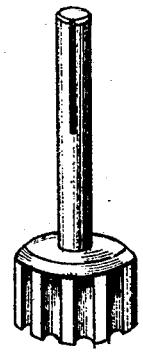
Figure 3 is a detached view of the vertical shaft, to which the flanged pinion is secured.

The construction, operation, and relative arrangement of the component parts of my invention are as follows:

The king-post or main driving-shaft A is mounted within the metallic box $a$, cast solid with the gudgeon $a'$, which is stepped upon a metallic bearing.

The levers B consist of the two beams, $b$, secured rigidly to the king-post, and sprung and bolted together at the ends, as shown in the drawing, in such a manner that one acts as a brace for the other.

The upper end of the king-post A fits closely within the sleeve $d$, cast solid with and upon the bottom of the internally-toothed spur-gear or king-wheel D.

The under side of the wheel D is provided with a flange of a width equal to the length of the teeth of the said wheel, which forms a rest for the teeth of the flanged pinion E, which is rigidly attached to the upright shaft $e$.

The main driving-wheel is provided with a gudgeon, $d'$, the bottom of which consists of a plate provided with a square point or projection, which fits into an aperture of similar shape in the core of the said wheel, and rests upon the top of the king-post. The said gudgeon is secured in position by means of bolts passing through the flange or plate constituting the bottom thereof.

This method of attaching the gudgeon to the wheel causes it to assume a perfectly true and erect position, and requires less skill to adjust it in place than would be required otherwise.

Internally-toothed spur-gear is adopted as the driving-wheel, in order to insure compactness and economy of space, and from the fact that it runs with less friction, and is capable of transmitting greater force than the ordinary spur-gears.

The teeth within the driving-wheel D gear with and operate the flanged pinion E, attached to the upright shaft $e$.

The said shaft passes through a circular aperture cut in the bed-plate M, and is provided with a longitudinal groove, $e'$, for the reception of the feather-key, $g$, attached to the bevel-gear G.

By this arrangement of the feather-key and groove the bevel-wheel G is allowed to move up and down upon the shaft $e$, and readily adjusts itself upon the same when the floor to which the bed-plate is attached sinks or rises.

The said vertical shaft $e$ is supported in an upright and permanent position by the flange on the bottom of the driving-wheel, upon which the pinion is supported, and the flange upon the pinion which rests upon the tops of the teeth of the driving-wheel.

The bevel-wheel G engages with the bevel-gear N, attached to horizontal shaft H, which has its bearings in journal-boxes upon the standards I, and operates the drum-wheel K.

The operation of the machine is apparent from the foregoing description of its construction.

The rotary motion imparted by the revolution of the king-post is transmitted by means of the internally-toothed spur-gear and pinion to the bevel-wheel, which, being arranged upon an upright shaft by means of a groove and feather-key, as described, rises and falls upon the same with the gin-house floor, to which the bed-plate is attached, and thus always maintains a perfect adjustment, while the upright shaft is permanently secured in position and prevented from settling by the flange upon the pinion and the flange upon the bottom of the main driving-wheel.

Having thus described the construction and operation of my invention,

I will indicate what I claim and desire to secure by Letters Patent in the following clause:

The combination of the main driving-wheel D, flanged pinion E, grooved shaft $e$, and bevel-wheel G, provided with a feather-key, $g$, when constructed and operating as and for the purpose described.

In testimony that I claim the foregoing I have hereunto set my hand this 20th day of November, 1869.

J. W. WILCOX.

Witnesses:
 I. F. CAIN,
 HENRY W. COWLES.